United States Patent
Hiroe

(10) Patent No.: US 11,868,072 B2
(45) Date of Patent: Jan. 9, 2024

(54) IMAGE PROCESSING APPARATUS

(71) Applicant: TOSHIBA TEC KABUSHIKI KAISHA, Tokyo (JP)

(72) Inventor: Yoshihito Hiroe, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 92 days.

(21) Appl. No.: 17/679,040

(22) Filed: Feb. 23, 2022

(65) Prior Publication Data

US 2023/0266702 A1    Aug. 24, 2023

(51) Int. Cl.
*H04N 1/00* (2006.01)
*G03G 15/00* (2006.01)

(52) U.S. Cl.
CPC ....... *G03G 15/507* (2013.01); *H04N 1/00015* (2013.01); *H04N 1/00039* (2013.01); *H04N 1/00045* (2013.01); *H04N 1/00063* (2013.01); *H04N 1/00082* (2013.01); *H04N 1/00809* (2013.01); *G03G 2215/00569* (2013.01)

(58) Field of Classification Search
CPC ....................... H04N 1/00045; H04N 1/00809
See application file for complete search history.

(56) References Cited

U.S. PATENT DOCUMENTS

| | | | |
|---|---|---|---|
| 5,247,371 A | 9/1993 | Hikawa | |
| 11,042,333 B2* | 6/2021 | Nose | H04N 1/393 |
| 2006/0126113 A1 | 6/2006 | Narazaki | |
| 2007/0057987 A1 | 3/2007 | Miyamoto et al. | |
| 2009/0033971 A1 | 2/2009 | Kawai | |
| 2009/0296119 A1* | 12/2009 | Kurihara | H04N 1/32133 358/1.9 |
| 2010/0195156 A1* | 8/2010 | Horiuchi | H04N 1/00355 358/1.16 |
| 2010/0201995 A1* | 8/2010 | Yoshida | H04N 1/3875 358/1.13 |
| 2013/0003084 A1* | 1/2013 | Hirose | G06K 15/027 358/1.2 |
| 2017/0274691 A1 | 9/2017 | Nakahara | |
| 2019/0196379 A1* | 6/2019 | Sugata | G03G 15/5058 |
| 2019/0204773 A1* | 7/2019 | Miyagawa | G03G 15/5025 |
| 2020/0177761 A1* | 6/2020 | Mizuno | H04N 1/3248 |
| 2022/0109767 A1* | 4/2022 | Takahashi | B41J 11/0095 |
| 2022/0318582 A1* | 10/2022 | Ishii | B41J 11/663 |
| 2023/0266702 A1* | 8/2023 | Hiroe | H04N 1/00082 358/474 |

FOREIGN PATENT DOCUMENTS

| | | | |
|---|---|---|---|
| JP | H01-220962 A | 9/1989 | |
| JP | H02-231694 A | 9/1990 | |

(Continued)

*Primary Examiner* — Ted W Barnes
(74) *Attorney, Agent, or Firm* — Kim & Stewart LLP

(57) ABSTRACT

An image processing apparatus includes a scanner configured to read an image formed on a sheet along a reading direction and generate image data thereof, and a processor. The processor is configured to select a first region of the generated image data into which a first image indicating the reading direction is to be combined, set a pixel value of the first image in accordance with a pixel value of a pixel around the first region, and combine the first image having the determined pixel value into the first region of the image data and output the combined image data.

20 Claims, 15 Drawing Sheets

(56) References Cited

FOREIGN PATENT DOCUMENTS

| | | |
|---|---|---|
| JP | H11-254793 A | 9/1999 |
| JP | 2006-303920 A | 11/2006 |
| JP | 2007-081936 A | 3/2007 |
| JP | 2008-147954 A | 6/2008 |
| JP | 2008-225377 A | 9/2008 |
| JP | 2011-077620 A | 4/2011 |
| JP | 2012-237874 A | 12/2012 |

* cited by examiner

IMAGE PROCESSING APPARATUS

FIELD

Embodiments described herein relate generally to an image processing apparatus and an image processing method.

BACKGROUND

To determine a cause of a malfunction or perform maintenance of an image processing apparatus, such as an MFP (multi-function printer), it is sometimes necessary to obtain information indicating the reading (scanning) direction or the printing direction for a document page (sheet) or the like. In such cases, for example, a user may sometimes mark an arrow on the sheet for indicating the orientation of the sheet during reading or printing. Information indicating the sheet direction or orientation is sometimes found in a work report prepared by a repairman or technician.

However, if the direction indicated by an arrow written by a user is wrong or a report prepared by a repairman lacks information about the direction, it takes longer for maintenance work.

DETAILED DESCRIPTION

In general, according to one embodiment, an image processing apparatus includes a scanner configured to read an image formed on a sheet along a reading direction and generate image data thereof, and a processor. The processor is configured to select a first region of the generated image data into which a first image indicating the reading direction is to be combined, set a pixel value of the first image in accordance with a pixel value of a pixel around the first region, and combine the first image having the determined pixel value into the first region of the image data and then output the combined image data.

An image processing apparatus according to certain example embodiments will be described with reference to the drawings.

Figure 1:
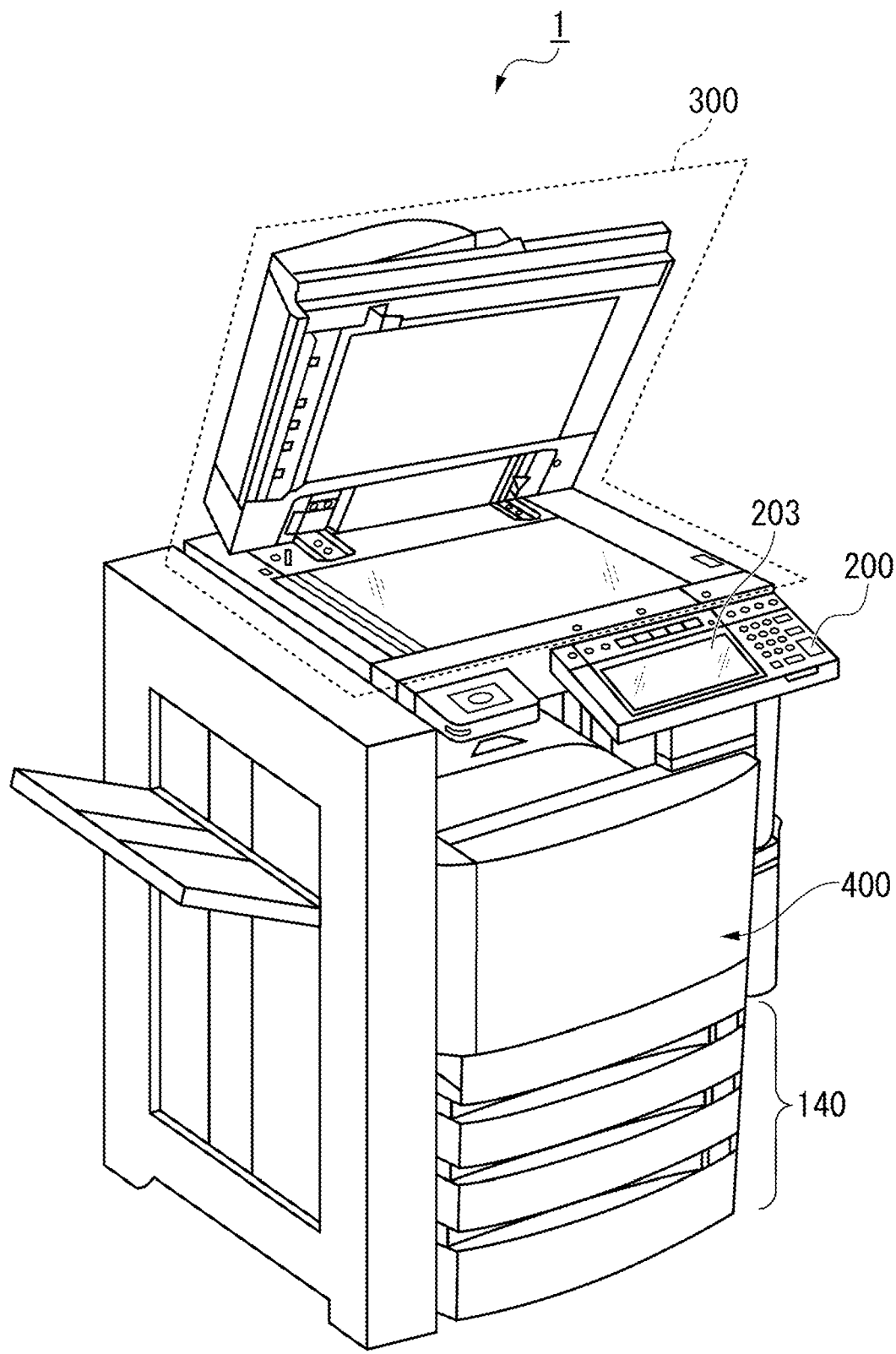
FIG. 1 is an external view of an image processing apparatus according to an embodiment.
Figure 2:
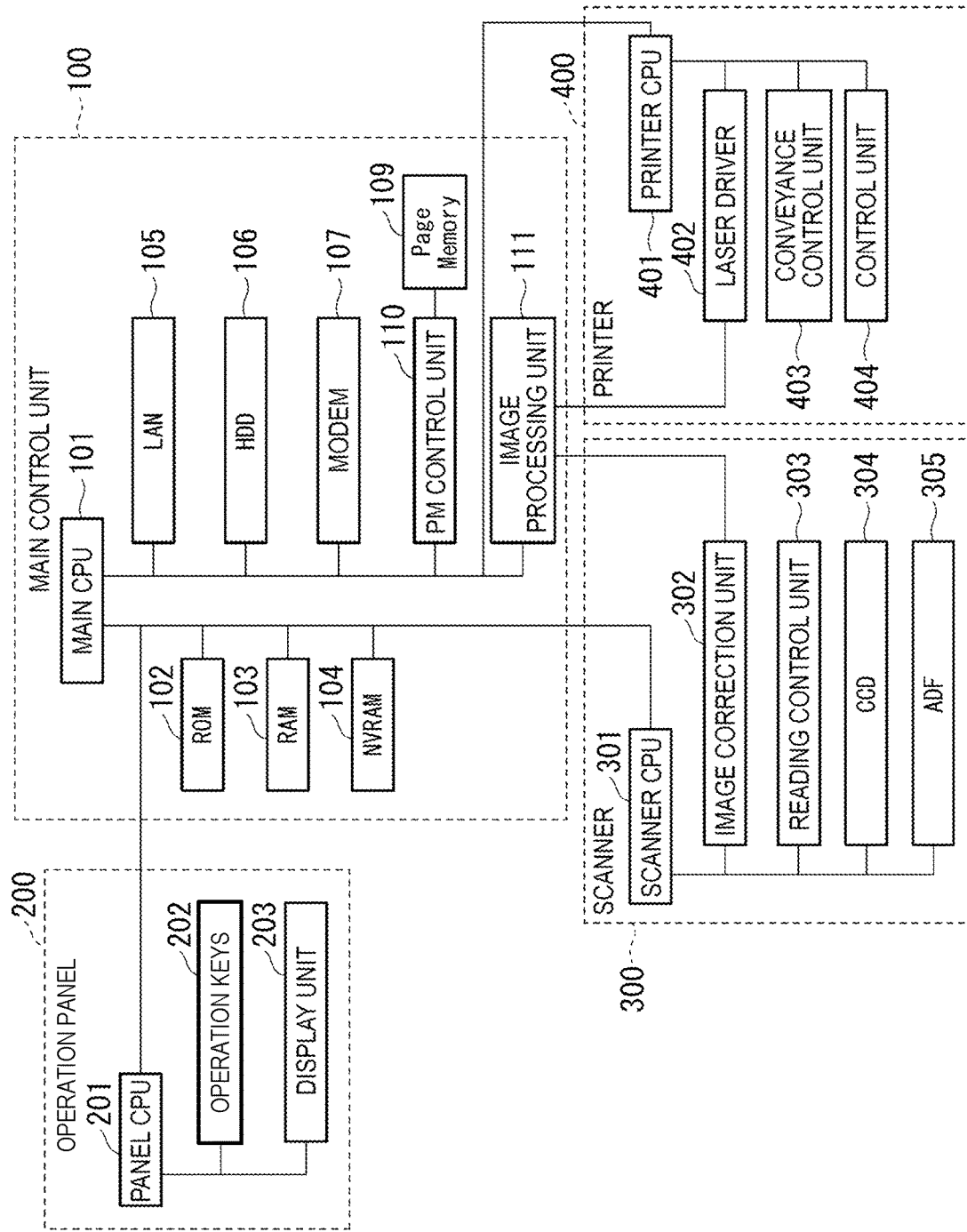
FIG. 2 is a hardware block diagram of an image processing apparatus.

FIG. 1 is an external view of an image processing apparatus 1 according to an embodiment. FIG. 2 is a hardware block diagram of the image processing apparatus 1. For example, the image processing apparatus 1 is an image forming apparatus such as an MFP. The image processing apparatus 1 includes a main control unit 100, a sheet storage unit 140, an operation panel 200, a scanner 300, and a printer 400. The image processing apparatus 1 forms an image on a sheet using developer. The developer is, for example, toner. In the following description, the developer is a toner as one example. A sheet is, for example, a paper sheet or a label sheet. In general, any sheet type may be used as long as the image forming apparatus 1 can form an image on the surface of the sheet.

The operation panel 200 includes one or more operation keys 202 and a display unit 203. The operation panel 200 accepts an operation from a user. The operation panel 200 outputs a signal to the main control unit 100 in response to the operation that has been input by the user.

The display unit 203 is an image display device such as a liquid crystal display or an organic electro luminescence (EL) display. The display unit 203 displays various kinds of information regarding the image forming apparatus 1.

The printer 400 forms an image on a sheet based on image data generated by the scanner 300 or image data received via a network. The printer 400 forms such an image using toner. A sheet on which an image is to be formed may be stored in the sheet storage unit 140 or fed manually by the user. In the following description, forming of an image is also expressed as printing of an image.

The sheet storage unit 140 stores sheets on which an image is to be formed by the printer 400.

The scanner 300 reads a reading target image and records it as read image data. The recorded image data may be transmitted to another information processing device via a network. The image indicated by the recorded image data may be formed on a sheet by the printer 400.

Next, with reference to FIG. 2, the image processing apparatus 1 includes the main control unit 100, the operation panel 200, the scanner 300, and the printer 400. The image processing apparatus 1 includes a main CPU (central processing unit) 101 of the main control unit 100, a panel CPU 201 of the operation panel 200, a scanner CPU 301 of the scanner 300, and a printer CPU 401 of the printer 400.

The main control unit 100 includes the main CPU 101, a ROM (read only memory) 102, a RAM (random access memory) 103, a NVRAM (nonvolatile RAM) 104, a network controller 105, an HDD (hard disk drive) 106, a modem 107, a page memory (PM) 109, a page memory control unit 110, and an image processing unit 111.

The main CPU 101 controls the entire operation of the image processing apparatus 1. The ROM 102 stores data such as a control program necessary for the control. The RAM 103 temporarily stores data. The NVRAM 104 is a nonvolatile memory.

The network controller 105 connects the image processing apparatus 1 to a network. The image processing apparatus 1 communicates with, for example, an external device such as a server or a personal computer (PC) via the network controller 105. The HDD 106 stores data such as an image to be formed on a sheet or an image read by the scanner 300. Of the image data stored in the HDD 106, information indicating a reading resolution in a reading operation and a recording resolution recorded in the HDD 106 is included in a header of the image data read by the scanner 300. The modem 107 connects the image processing apparatus 1 to a telephone line.

The page memory 109 stores image data corresponding to each of a plurality of pages. The page memory control unit 110 controls the page memory 109. The image processing unit 111 performs image processing on the image data. Specific examples of the image processing include a color conversion process, a color range correction process, a sharpness adjustment process, gamma correction and halftone processing, and pulse width modulation (PWM) processing. The image processing unit 111 may be implemented using hardware such as an application specific integrated circuit (ASIC) or may be implemented as software executed by the main CPU 101.

The operation panel 200 includes the panel CPU 201, the operation keys 202, and the display unit 203. The panel CPU 201 controls the operation panel 200. The panel CPU 201 is connected to the main CPU 101 via a bus. If an instruction for display is received from the main CPU, the panel CPU 201 generates a screen for the display unit 203 in response to the received instruction. If a numerical value, a user selection of a process for execution, or setting information is input via one or more of the operation keys 202, the panel CPU 201 outputs corresponding data to the main CPU 101. The operation keys 202 permit the input of user selections, the setting information, the numerical values, and the like. Specific examples of information received by an operation key 202 include various instructions or settings such as a size and direction of a sheet on which an image is to be formed or a magnification of image formation. The display unit 203 is a display device such as a liquid crystal display or an organic EL display. The display unit 203 may be configured as a touch panel.

The scanner 300 includes the scanner CPU 301, an image correction unit 302, a reading control unit 303, a charge coupled device (CCD) 304, and an auto document feeder (ADF) 305. The scanner CPU 301 controls the scanner 300. The image correction unit 302 includes, for example, an A/D conversion circuit, a shading correction circuit, and a line memory. The A/D conversion circuit converts analog signals of R, G, and B output from the CCD 304 into digital signals. The ADF 305 is an auto document conveyance unit. The ADF 305 picks up and conveys a sheet set by a user along a conveyance path in a conveyance direction. The ADF 305 conveys the sheet by rotating a conveyance roller along the conveyance path and the CCD 304 reads an image on the sheet which is being conveyed.

The printer 400 includes the printer CPU 401, a laser driver 402, a conveyance control unit 403, and a control unit 404. The printer CPU 401 controls the printer 400. The laser driver 402 drives a laser to form an electrostatic latent image on a photoreceptor. The conveyance control unit 403 conveys a sheet which is an image forming target. The control unit 404 controls the laser driver 402 such that an image is formed on the sheet conveyed by the conveyance control unit 403.

Figure 3:
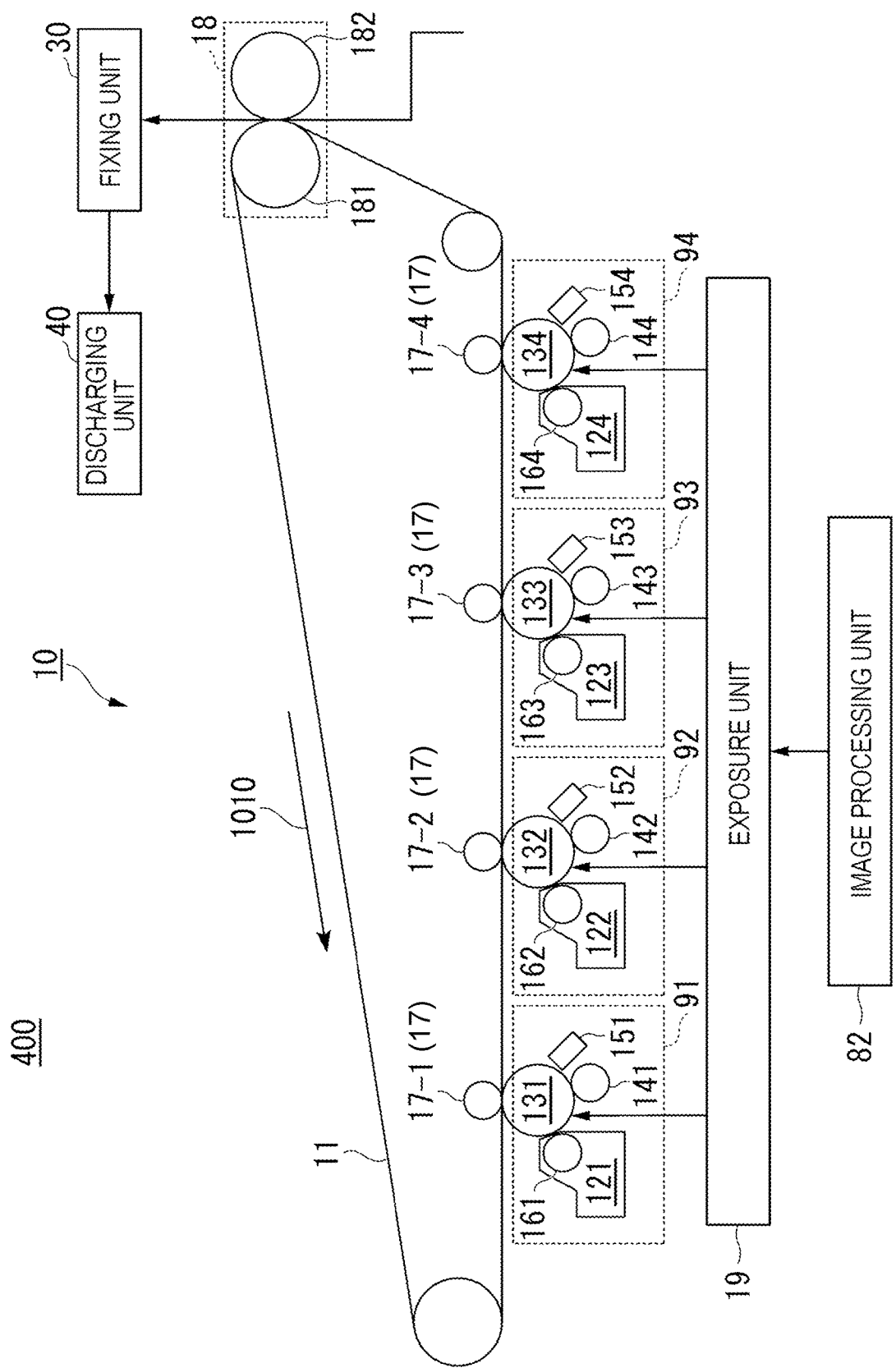
FIG. 3 is a diagram illustrating an internal structure of a printer.

FIG. 3 is a diagram illustrating the internal structure of the printer 400. In the example of FIG. 3, the printer 400 is a four-tandem type printer. Here, the printer 400 is not limited to the four-tandem type printer.

The printer 400 includes an image forming unit 10, a fixing unit 30, and a discharging unit 40. The image forming unit 10 includes an intermediate transfer body 11, developing devices 91 to 94, a plurality of primary transfer rollers 17 (17-1 to 17-4), a secondary transfer unit 18, and an exposure unit 19.

The intermediate transfer body 11 is, for example, an endless belt. The intermediate transfer body 11 is rotated in a direction indicated by an arrow 1010 by a roller. In this disclosure, upstream and downstream sides are defined according to the direction in which the intermediate transfer body 11 moves in normal operation. Visible images generated by the developing devices 91 to 94 are transferred to the surface of the intermediate transfer body 11.

The developing devices 91 to 94 form visible images using toner with different properties. For example, toner of different colors may be used in the developing devices 91 to 94. For example, toners with colors of yellow (Y), magenta (M), cyan (C), and black (K) may be used. In some of the developing devices 91 to 94, toner which can be later decolored after initial printing by an external stimulus (for example, heat) may be used. In some of the developing devices 91 to 94, a special toner such as glossy toner or fluorescent toner may be used.

In FIG. 3, of the four developing devices 91 to 94, the developing device 91 is located most upstream and the developing device 94 is located most downstream.

The developing devices 91 to 94 store toners with different properties but each of the developing devices 91 to 94 have the same basic structure. The developing device 91 includes a developing unit 121, a photosensitive drum 131, a charger 141, a cleaning blade 151, and a developing drum 161. The developing device 92 includes a developing unit 122, a photosensitive drum 132, a charger 142, a cleaning blade 152, and a developing drum 162. The developing device 93 includes a developing unit 123, a photosensitive drum 133, a charger 143, a cleaning blade 153, and a developing drum 163. The developing device 94 includes a developing unit 124, a photosensitive drum 134, a charger 144, a cleaning blade 154, and a developing drum 164.

The developing device 91 will be explained as structurally and functionally representative of the other developing devices 92, 93, and 94. The developing device 91 includes the developing unit 121, the photosensitive drum 131, the charger 141, the cleaning blade 151, and the developing drum 161. The developing unit 121 stores toner and carrier therein. The developing unit 121 attaches the toner to the photosensitive drum 131 by the developing drum 161.

The photosensitive drum 131 includes a photoreceptor on its outer circumference. The photoreceptor is, for example, an organic photoconductor (OPC). The photosensitive drum 131 is exposed by the exposure unit 19 and forms an electrostatic latent image on the surface.

The charger 141 uniformly charges the surface of the photosensitive drum 131.

The cleaning blade 151 is, for example, a plate member. The cleaning blade 151 is formed of, for example, a rubber such as a urethane resin. The cleaning blade 151 removes the toner attached on the photosensitive drum 131.

Next, an overall operation of the developing device 91 will be described. The photosensitive drum 131 is charged with a predetermined potential by the charger 141. Subsequently, the photosensitive drum 131 is radiated with light from the exposure unit 19. Thus, a potential of the region radiated with the light is changed on the photosensitive drum 131. Due to this change, an electrostatic latent image is formed on the surface of the photosensitive drum 131. The electrostatic latent image on the surface of the photosensitive drum 131 is subsequently developed with the toner of the developing unit 121. That is, a visible image (an image formed with toner) is formed on the surface of the photosensitive drum 131.

At the primary transfer rollers 17 (17-1 to 17-4), the developing devices 91 to 94 transfer the visible images respectively formed on the photosensitive drums 131 to 134 to the intermediate transfer body 11.

The secondary transfer unit 18 includes a secondary transfer roller 181 and a secondary transfer counter roller 182. The secondary transfer unit 18 transfers the visible images from the intermediate transfer body 11 to a sheet. The transferring in the secondary transfer unit 18 can be implemented by, for example, generation of an electrical potential difference between the secondary transfer roller 181 and the secondary transfer counter roller 182.

The exposure unit 19 forms an electrostatic latent image by radiating the photosensitive drums 131 to 134 of the developing devices 91 to 94 with light. The exposure unit 19 includes a light source such as a laser or a light-emitting diode (LED). In the present embodiment, the exposure unit 19 includes a laser and operates under the control of the laser driver 402.

The fixing unit 30 fixes the visible images (toner images) to a sheet by heating and pressing the visible images on the sheet. The discharging unit 40 discharges the sheet after the sheet has been fixed in the fixing unit 30 to the outside of the image processing apparatus 1.

Next, a reading-direction image that indicates a reading direction and an image-forming-direction image that indicates an image forming direction will be described. The reading-direction image and the image-forming-direction image are images used by a repairman executing maintenance, inspection, or the like of the image processing apparatus 1 to easily identify the reading direction and the image forming direction of the image processing apparatus 1. If the reading direction or the image forming direction can be easily identified, the time and effort necessary to determine a fault or malfunction of the image processing apparatus 1 can be considerably reduced than would otherwise be the case.

The reading-direction image is an image indicating a reading direction in which a document sheet is read by the scanner 300. When a document sheet is scanned in the image processing apparatus 1, the reading-direction image indicating the reading direction in the scanner 300 is combined with image data that is read from the document. Specifically, the combination is performed as follows. The image processing unit 111 of the main control unit 100 combines the reading-direction image with image data generated through scanning. The image processing unit 111 records the image data combined with the reading-direction image in the HDD 106.

The reading direction in the scanner 300 is a sub-scanning direction of a line sensor and is a direction from one of four sides of the document finally read by the line sensor towards the opposite side first read by the line sensor.

Figure 4:
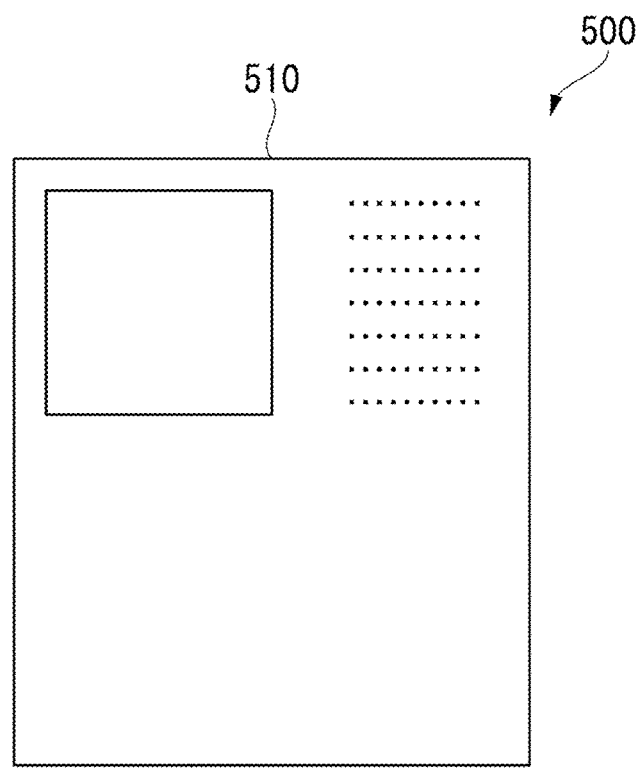
FIG. 4 is a diagram illustrating an example of a document sheet.

Accordingly, the reading direction is uniquely determined, for example, if the side (edge) of a document that has been read first is specified. Accordingly, the reading-direction image is an image used to specify the one of the four sides of a document sheet that has been first read by the line sensor. FIG. 4 is a diagram illustrating an example of a document sheet 500. Of four sides of the document sheet 500, the side first read by the scanner 300 is denoted by the reference numeral 510.

Figure 5:
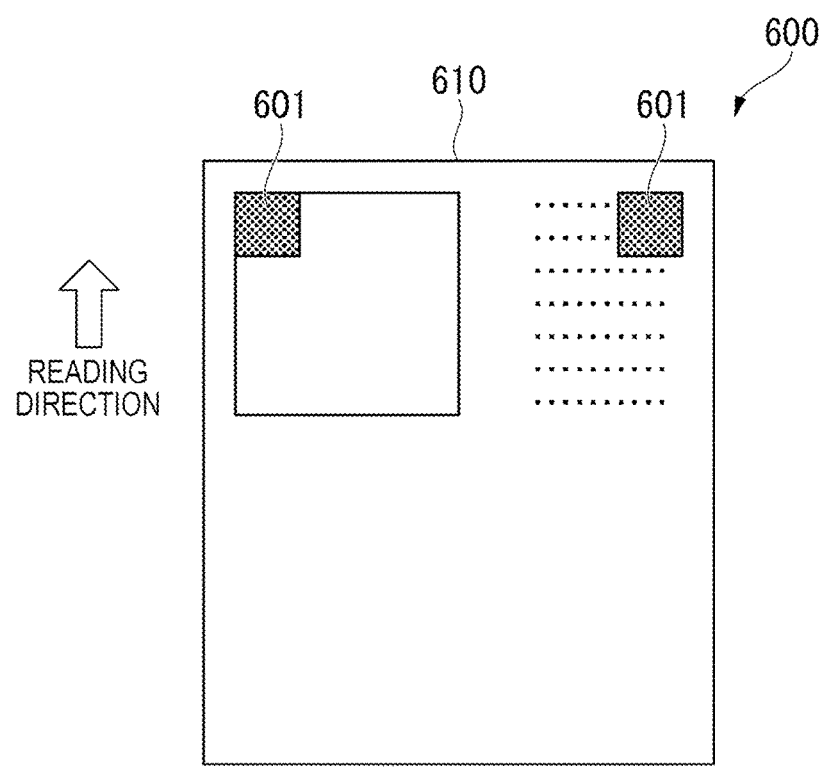
FIG. 5 is a diagram illustrating combined image data in which reading-direction images are combined.

FIG. 5 is a diagram illustrating combined image data 600 in which reading-direction images 601 are combined. In the combined image data 600, the reading-direction images 601 are combined. In the example of FIG. 5, two symbols (for example, rectangles, specifically, squares) are arranged along a direction perpendicular to the reading direction. However, if the reading direction can be determined, any number of symbols having any shape may be used as the reading-direction image(s) 601. In the combined image data 600, a side 610 corresponds to the side 510 of the document sheet 500. The side 610 is specified with the reading-direction images 601 configured in combination of two symbols (a pair). Thus, the reading direction is easily identifiable.

The image data of a document sheet is recorded in the HDD 106 with a resolution different from a resolution during reading of the document sheet in some cases. For example, a resolution during reading of the document sheet is 600 dpi and a resolution of the image data recorded in the HDD 106 is 300 dpi in some cases. In such cases, if the reading-direction image is combined as it is, a part of the reading-direction image may be lost.

Figure 6:
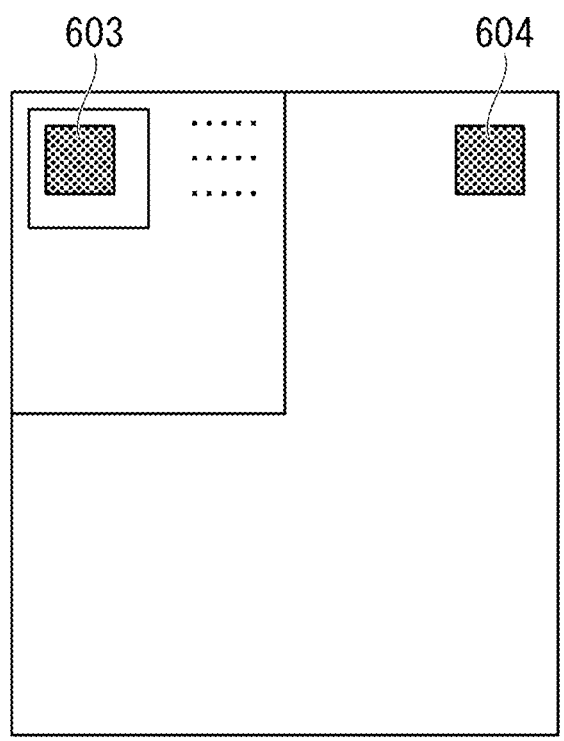
FIG. 6 is a diagram illustrating image data in which a reading-direction image is not combined correctly.

FIG. 6 is a diagram illustrating image data in which a reading-direction image is not combined correctly. Since the resolution decreases, the image recorded in the HDD 106 is smaller than the original image. Therefore, as illustrated in FIG. 6, a symbol 603 that is a combined reading-direction image remains, whereas the other symbol 604 is outside the image data and is not combined.

Accordingly, the image processing unit 111 determines a position at which each reading-direction image is disposed and a size of the reading-direction image based on a reading resolution and a recording resolution so that any reading-direction image is not lost. Correction of a combination position and correction of the size of the reading-direction image are expressed as a reading-direction image correction process together. Hereinafter, an example of the reading-direction image correction process will be described.

If the reading resolution and the recording resolution are the same, coordinates of combination positions of the symbols of the reading-direction images are (XPOS1, YPOS1) and (XPOS2, YPOS2). The reading resolution is IN_DPI and the recording resolution is OUT_DPI. A correction coefficient K is OUT_DPI/IN_DPI. When the reading resolution and the recording resolution are the same, the lengths of the reading-direction image in the transverse direction and the longitudinal direction are XSIZE and YSIZE.

The image processing unit 111 derives (K×XPOS1, K×YPOS1) and (K×XPOS2, K×YPOS2) as coordinates of the corrected combination positions. The image processing unit 111 derives K×XSIZE and K×YSIZE as the lengths of the reading-direction image corrected in the transverse direction and the longitudinal direction as coordinates of the corrected combination positions. For example, if IN_DPI is 600 dpi and OUT DPI is 300 dpi, the correction coefficient is 0.5. Therefore, each reading-direction image is a symbol with half the size in the transverse and longitudinal directions.

Figure 7:
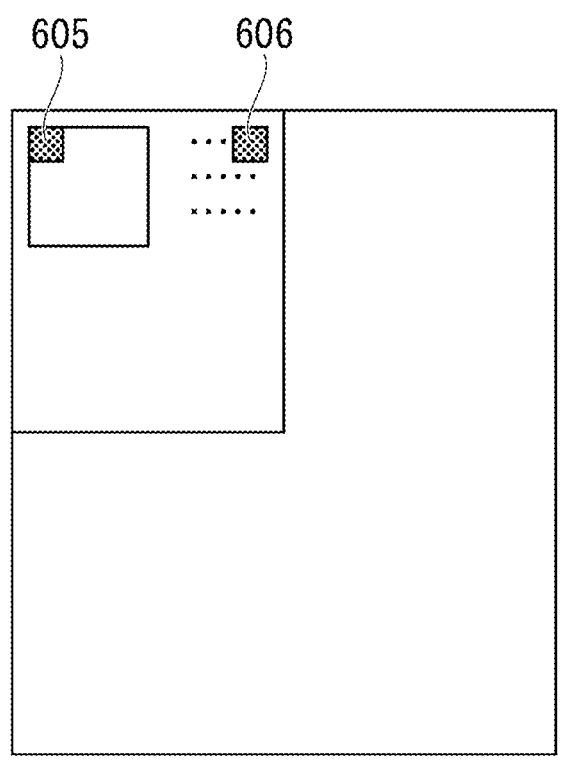
FIG. 7 is a diagram illustrating combined image data after correction.

FIG. 7 is a diagram illustrating combined image data after correction. As illustrated in FIG. 7, the sizes of symbols 605 and 606 of the reading-direction images are further corrected according to the reduced resolution of the image data. In this way, even if the reading resolution and the recording resolution are different, the reading direction can also be specified. When the image data is printed, the reading resolution is set to the original. Thus, since the size of the reading-direction image is restored to the original size, the reading-direction image can be maintained with a constant size.

Next, reading-direction images combined during copying will be described. During copying, a document sheet is first read, magnification (image expansion or reduction) is performed in accordance with a designated magnification ratio, and printing is performed on a sheet with the designated size. If the position or the size of the reading-direction image is changed in accordance with the magnification, a repairman is unlikely to be able to determine whether an image printed on the sheet is an original image on the document sheet or a reading-direction image. Whether to perform magnification and the magnification ratio are recorded in the RAM 103. The image processing unit 111 determines whether to perform magnification, and the like with reference to the RAM 103.

Accordingly, if an image is magnified and is formed on a sheet, the image processing unit 111 combines the reading-direction image with the image data without changing a position at which the reading-direction image is combined and the size of the reading-direction image.

Figure 8:
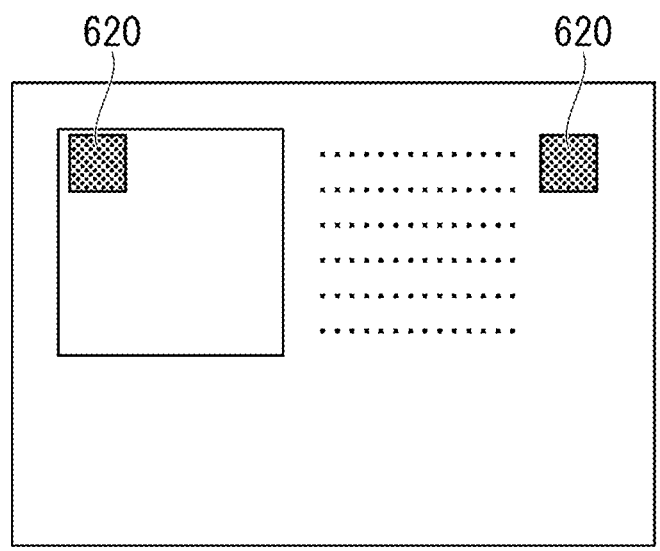
FIG. 8 is a diagram illustrating a sheet on which image data is printed without magnification.
Figure 9:
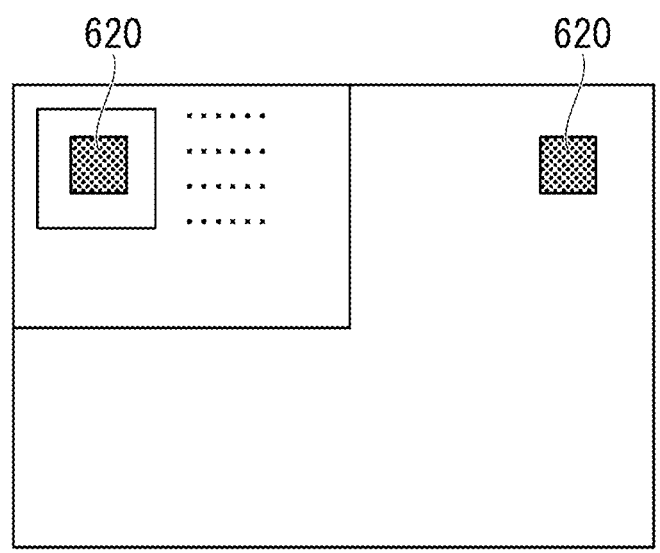
FIG. 9 is a diagram illustrating a sheet on which image data is reduced and printed.
Figure 10:
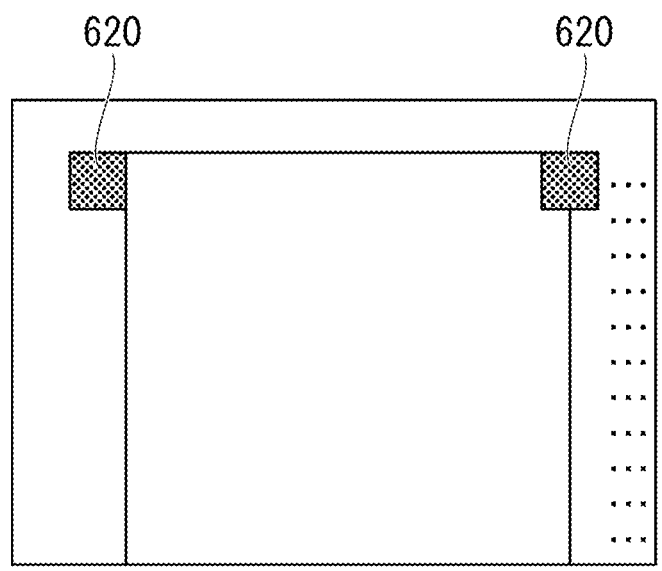
FIG. 10 is a diagram illustrating a sheet on which an image is expanded and printed.

FIG. 8 is a diagram illustrating a sheet on which image data is printed without magnification. FIG. 9 is a diagram illustrating a sheet on which image data is reduced and printed. FIG. 10 is a diagram illustrating a sheet on which image data is expanded and printed.

FIGS. 8, 9, and 10 each illustrate printing performed without changing the position at which each symbol 620 of the reading-direction image is combined and the size of each symbol 620 of the reading-direction image. In this way, a repairman can determine whether an image printed on the sheet is an original image or a reading-direction image.

Next, combination of an image-forming-direction image indicating an image forming direction with image data will be described. Here, the image forming direction is a conveyance direction of a sheet passing through the secondary transfer unit 18.

For example, the image forming direction is uniquely determined if the side (edge) of a sheet first passing through the secondary transfer unit 18 is specified. In such a case, the image-forming-direction image is an image with which the side first passing through the secondary transfer unit 18 is specified among four sides of the sheet. The conveyance direction of the sheet is determined in accordance with a direction of the sheet in the sheet storage unit 140. Accordingly, the image processing unit 111 generates image data in which the image-forming-direction image is combined in accordance with the direction of the sheet in the sheet storage unit 140. The direction of the sheet is recorded in the RAM 103 for each cassette of the sheet storage unit 140. The image processing unit 111 records the combined image data in the HDD 106. The image data recorded in the HDD 106 is output to the printer 400.

Figure 11:
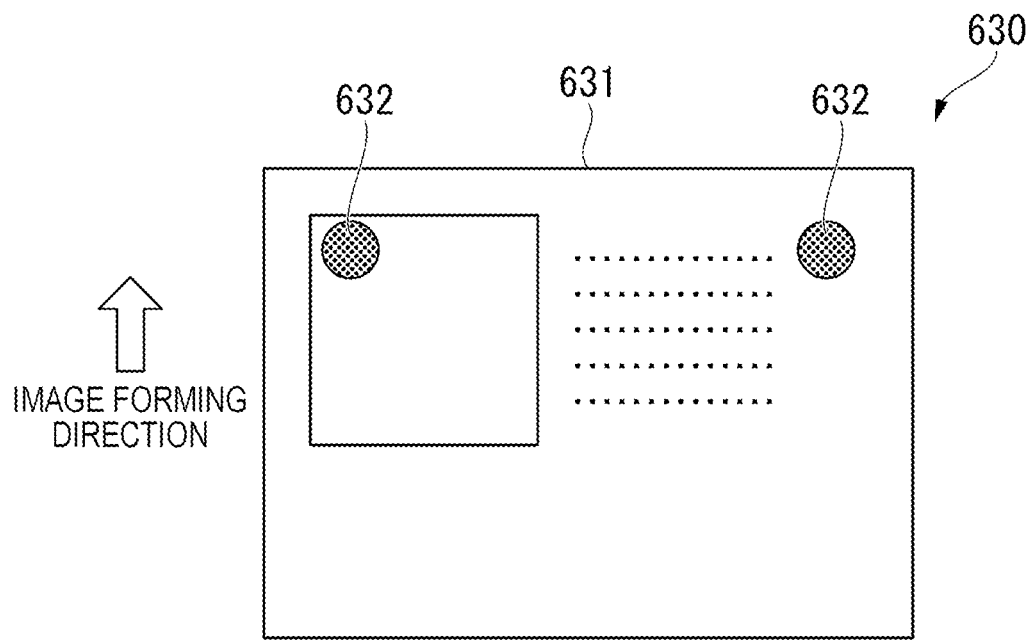
FIG. 11 is a diagram illustrating a sheet on which image-forming-direction images are printed.

FIG. 11 is a diagram illustrating a printed sheet 630 on which image-forming-direction images are printed. In FIG. 11, of four sides of the printed sheet 630, a side first passing through the secondary transfer unit 18 is a side 631. The side 631 is specified with two symbols 632 configuring the image-forming-direction images. In this way, the image forming direction is easily specified.

As illustrated in FIG. 11, each image-forming-direction image 632 is circular. That is, the reading-direction image and the image-forming-direction image have different shapes. However, those images may also or instead be different in size, color, density, pattern, or the like.

The image processing unit 111 combines the image-forming-direction image with the image data without changing the size of the image-forming-direction image even if the image is magnified and printed on a sheet. Thus, a repairman can determine whether the image printed on the sheet is an image originally formed on a document sheet or the image-forming-direction image.

Figure 12:
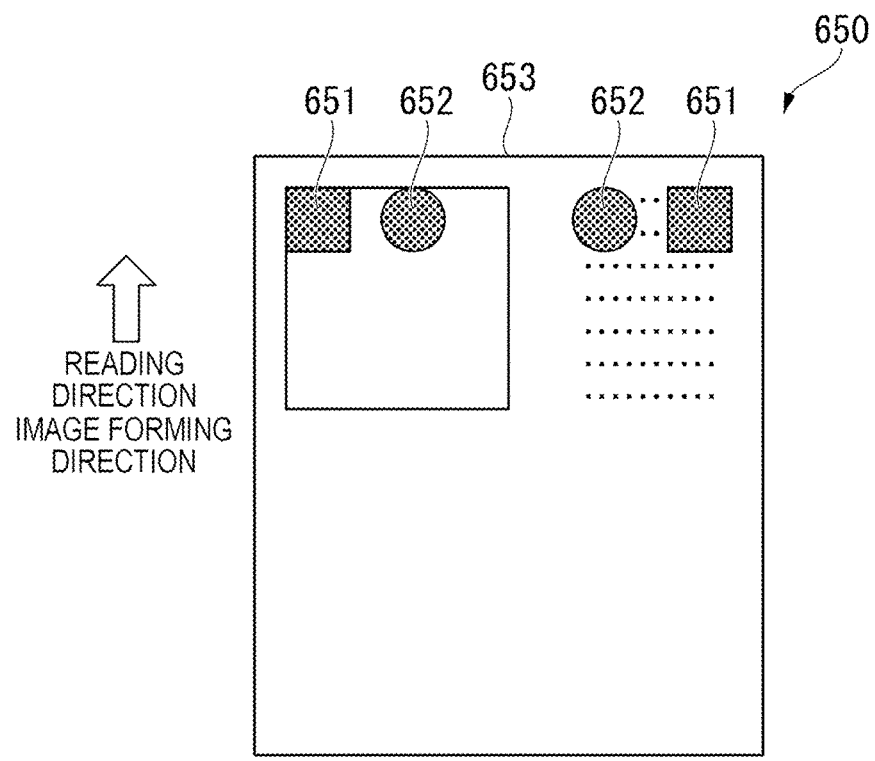
FIG. 12 is a diagram illustrating a sheet on which an image-forming-direction image and a reading-direction image are printed.
Figure 13:
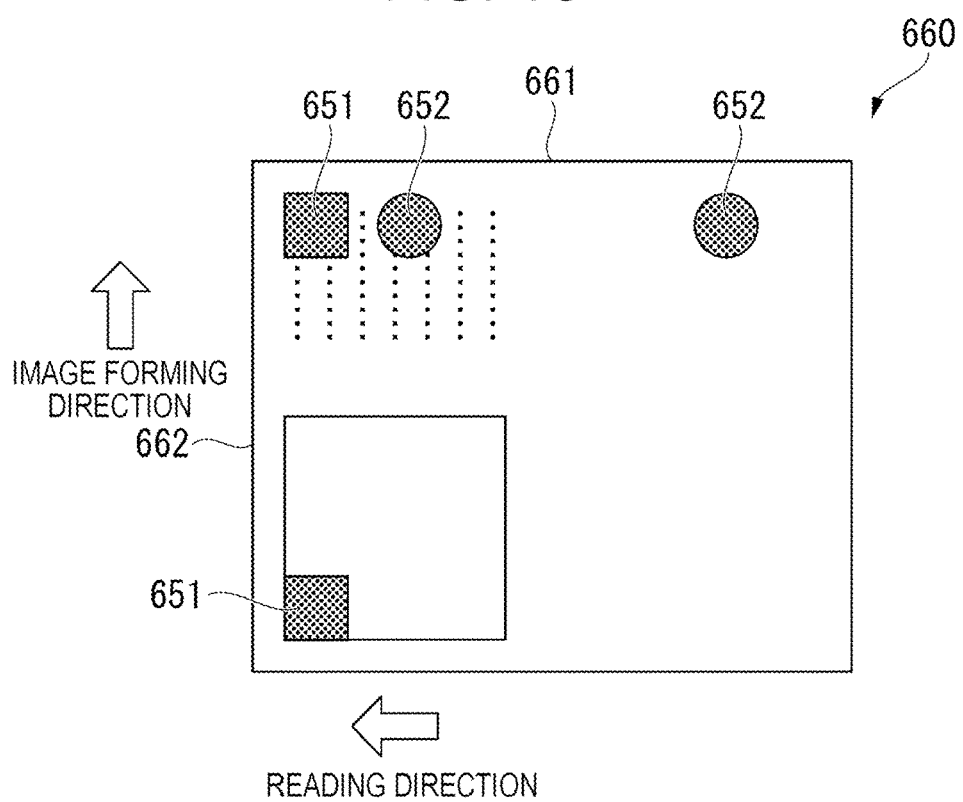
FIG. 13 is a diagram illustrating a sheet on which an image-forming-direction image and a reading-direction image are printed.

The image processing apparatus 1 can also perform printing by combining the image-forming-direction image and the reading-direction image. FIGS. 12 and 13 are diagrams illustrating a sheet on which both image-forming-direction images and reading-direction images are printed. In the examples illustrated in FIGS. 12 and 13, the sizes of the sheets are A4. In the examples illustrated in FIGS. 12 and 13, the reading direction is a longitudinal (long dimension) direction of A4.

In the examples illustrated in FIGS. 12 and 13, the directions of the sheets in the sheet storage unit 140 are different by 90°. Specifically, the direction of the sheet in the example illustrated in FIG. 12 is a direction in which a conveyance direction of the sheet is the longitudinal direction of A4. The direction of the sheet in the example illustrated in FIG. 13 is a direction (A4-R) in which the conveyance direction of the sheet is perpendicular to the longitudinal direction of A4.

Accordingly, in the example illustrated in FIG. 12, the reading direction is the same as the image forming direction. Therefore, reading-direction images 651 and image-forming-direction images 652 are combined in the same direction. In the example illustrated in FIG. 13, however, the reading direction is different from the image forming direction. Therefore, the reading-direction images 651 and the image-forming-direction images 652 are combined in different directions. Thus, since the reading direction and the printing direction can be easily identified, it is possible to considerably reduce the time and effort necessary for a repairman to inspect a fault.

As illustrated in FIGS. 12 and 13, the reading-direction images 651 and the image-forming-direction images 652 are combined without overlapping. For example, two patterns of combination positions of the image-forming-direction images are prepared. In one of the patterns, the positions of the image-forming-direction images are preset for a case in which only the image-forming-direction images are combined. In the other pattern, the positions of the image-forming-direction images and the reading-direction images are preset so as not to overlap each other. Thus, the image processing unit 111 can combine the reading-direction images and the image-forming-direction images without overlapping.

Figure 14:
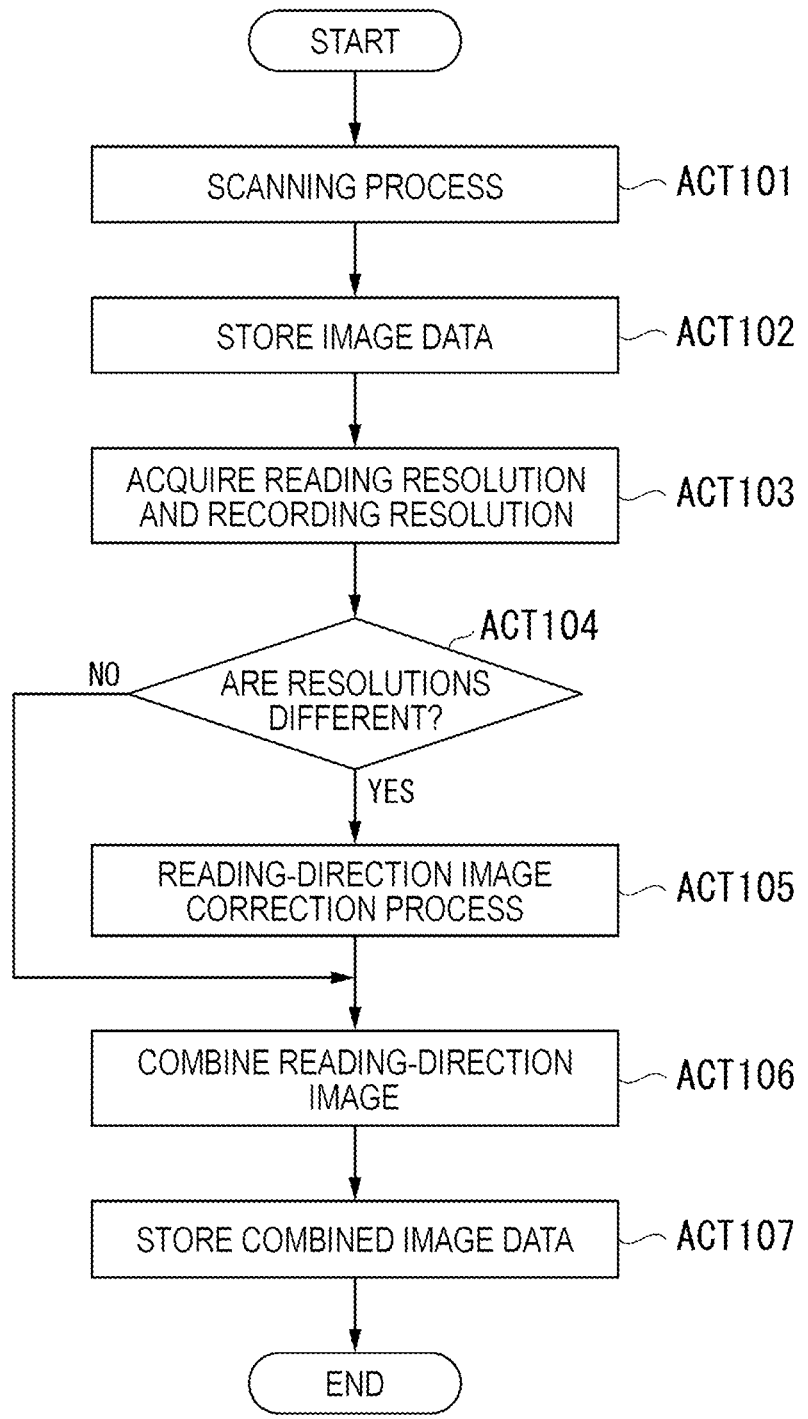
FIG. 14 is a flowchart of a process of combining read images.

Aspects of the above-described processes will be described with reference to certain flowcharts. FIG. 14 is a flowchart of a process of combining read images. The scanner 300 performs a scanning process (ACT101). The image data obtained through the scanning process is recorded in the page memory 109. The image processing unit 111 performs image processing on the image data recorded in the page memory 109 and records the image data in the HDD 106 (ACT102).

The image processing unit 111 acquires a reading resolution and a recording resolution from the image data recorded in the HDD 106 (ACT103). The image processing unit 111 determines whether the acquired reading resolution and recording resolution are different (ACT104). If the reading resolution is the same as the recording resolution (NO in ACT104), the image processing unit 111 causes the process to proceed to ACT106. If the reading resolution is different from the recording resolution (YES in ACT104), the image processing unit 111 performs a reading-direction image correction process (ACT105) such as described above.

The image processing unit 111 next combines the reading-direction image (ACT106). If the reading-direction image correction process is performed, the image processing unit 111 combines the reading-direction image at the position or with the size derived in the reading-direction image correction process. If the reading resolution is the same as the recording resolution, the image processing unit 111 combines the reading-direction image at the position or with the size in accordance with the reading resolution.

The image processing unit 111 then records the combined image data in the HDD 106 (ACT107) and ends the process.

Figure 15:
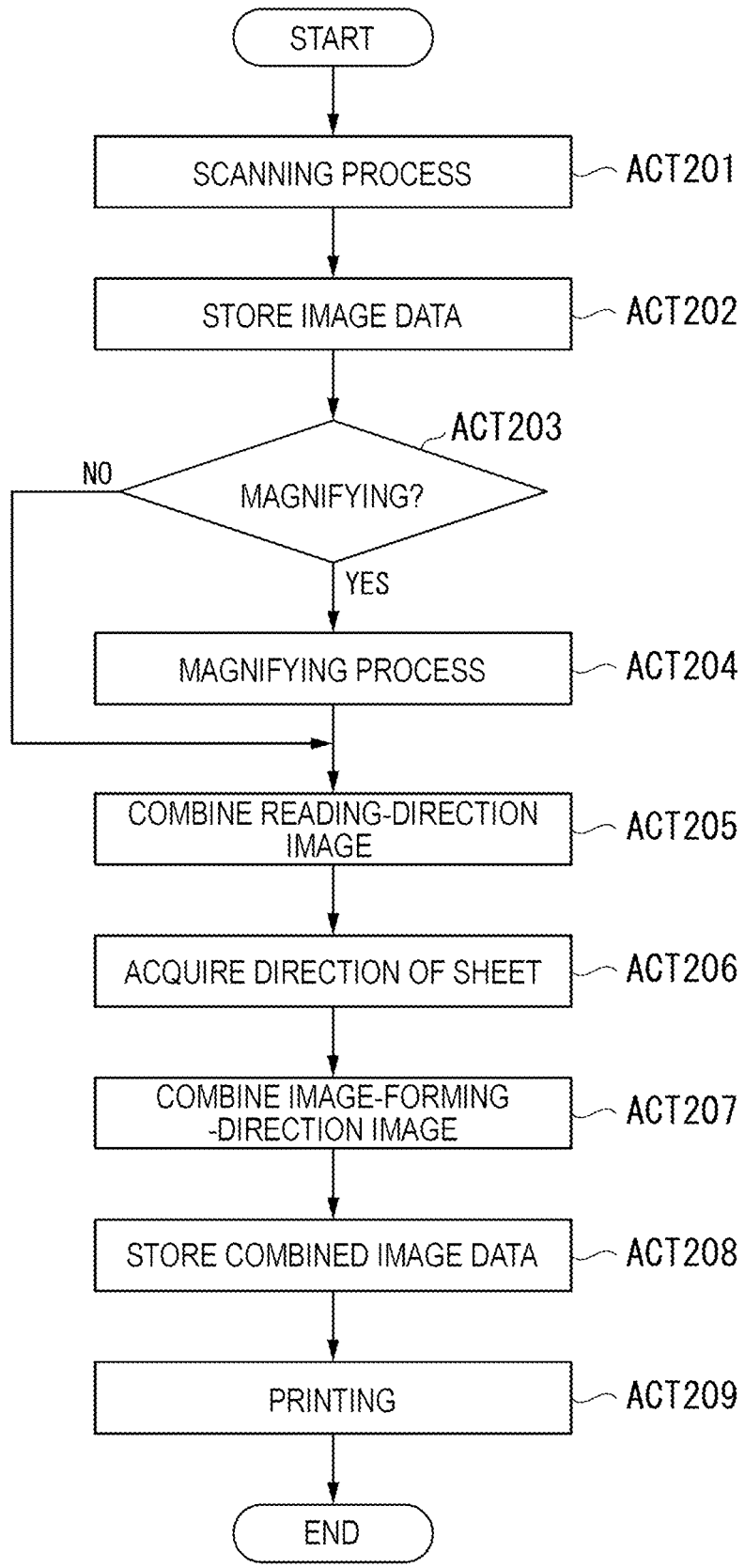
FIG. 15 is a flowchart of a process of combining a reading-direction image and an image-forming-direction image in copying.

FIG. 15 is a flowchart illustrating a process of combining a reading-direction image and an image-forming-direction image in copying. The scanner 300 performs a scanning process (ACT201). The image data obtained through the scanning process is recorded in the page memory 109. The image processing unit 111 performs image processing on the image data recorded in the page memory 109 and records the image data in the HDD 106 (ACT202).

The image processing unit 111 determines whether magnifying is being performed in the copying (ACT203). If the copying is to be performed without magnifying (NO in ACT203), the image processing unit 111 causes the process to proceed to ACT205. If magnifying is to be performed in the copying (YES in ACT203), the image processing unit 111 next performs the magnifying process (ACT204). The magnification ratio or the like can be recorded in the RAM 103. The image processing unit 111 then combines the reading-direction image (ACT205).

The image processing unit 111 acquires a direction (orientation) of a sheet in the sheet storage unit 140 (ACT206) on which an image is to be printed. The image processing unit 111 combines the image-forming-direction image in accordance with the acquired direction (ACT207). The image processing unit 111 records the combined image data in the HDD 106 (ACT208). The image processing unit 111 converts the image data recorded in the HDD 106 into printing image data (for example, raster data) and outputs the converted image data to the printer 400.

The printer 400 performs printing using the input image data (ACT209) and then ends the process.

Next, a color determination process for determining pixel color values of the reading-direction image will be described. If the reading-direction image is combined with the image data generated through scanning, the reading-direction image may be hidden, obscured, or invisible depending on the combined region. For example, the reading-direction image may be hidden by the color(s) of the surrounding regions around the reading-direction image having a color that matches (or substantially so) the color of the reading-direction image.

If the reading-direction image is hidden or obscured by the combined image data, it will be difficult for a person to view the reading-direction image on the sheet that is printed. Thus, if the image processing unit 111 of the main control unit 100 combines the reading-direction image with the image data, the color of the reading-direction image can be set or adjusted in accordance with the pixel values of the pixels adjacent or near the region in which the reading-direction image is provided.

A method of setting a color of the reading-direction image will be described. In order for the reading-direction image not to be hidden, the image processing unit 111 may change or set the color of the reading-direction image so that the color is different from a color of the pixels around the combined region.

The image processing unit 111 acquires the pixel values of the pixels around the combined region(the region with the reading-direction image therein). In the following description, the reading-direction image is configured as a solid symbol and the region adjacent to the solid symbol is referred to as the peripheral region.

Figure 16:
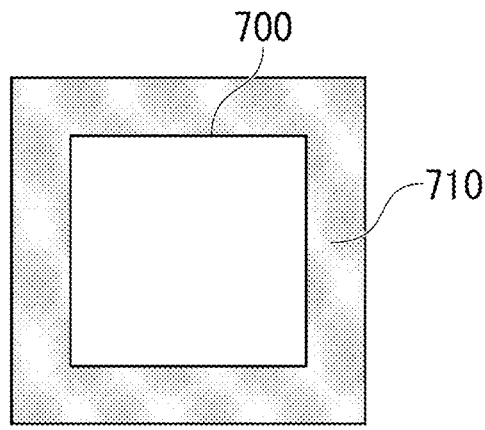
FIG. 16 is a diagram illustrating a symbol and a peripheral region.

FIG. 16 is a diagram illustrating a symbol 700 and a peripheral region 710. As illustrated in FIG. 16, the peripheral region 710 has a frame shape and surrounds the symbol 700.

The size of the peripheral region 710 can be set such that the symbol 700 within the peripheral region 710 can be visually distinguished by a person. For example, the thickness of the frame portion of the peripheral region 710 may be set to about 2 mm.

The image processing unit 111 acquires pixel values of the pixels in the peripheral region 710. For example, pixel values are expressed as red, green, and blue (RGB) values. The peripheral region 710 includes N total pixels and pixel values of these pixels are expressed as $Pi=(ri, gi, bi)$ (where $1 \leq i \leq N$). Here, $ri$ is a red pixel value (R value) of the $i^{th}$ pixel, $gi$ is a green pixel value (G value) of the $i^{th}$ pixel, and $bi$ is a blue pixel value (B value) of the $i^{th}$ pixel.

The image processing unit 111 calculates an average value of Pi. In such a case, the average value r of the red pixel values is $(r1+ \ldots +rN)/N$. The average value g of the green pixel values is $(g1+ \ldots +gN)/N$. The average value b of the blue pixel values is $(b1+ \ldots +bN)/N$. The image processing unit 111 sets the calculated average value (r, g, b) as the color corresponding to the peripheral pixels.

The image processing unit 111 checks that the color of the symbol is different from the calculated average (r, g, b) of the peripheral pixels. A color that is different from calculated average (r, g, b) is a color for which at least one of red value, green value, or blue value is different from the calculated average value (r, g, b). The image processing unit 111 may set the color of the symbol to be a complementary color corresponding to the peripheral pixel average values (r, g, b) by predetermined values. For example, the image processing unit 111 may obtain the complementary color by inverting or switching RGB values. The complementary color may be obtained by switching "a" component and "b" component of the calculated average value projected into a Lab color space.

The image processing unit 111 may determine that the color of the symbol 700 is to be a color having a saturation less than a threshold if the saturation of the pixels of the peripheral region is greater than the threshold. For example, the threshold can be set in advance and stored in the NVRAM 104. A color with a saturation less than the threshold to be used for the color of the symbol may be stored in the NVRAM 104 or may be appropriately calculated or set in accordance with calculated average values (r, g, b) of the peripheral region pixels.

Figure 17:
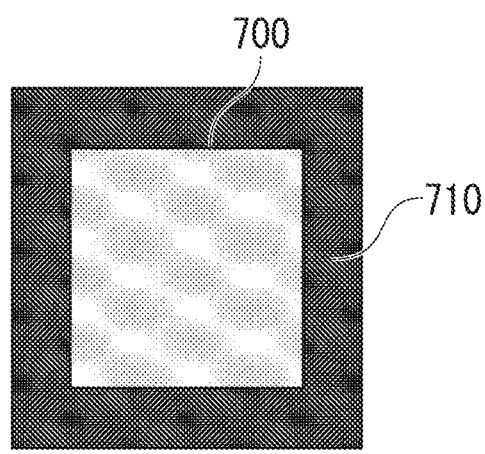
FIG. 17 is a diagram illustrating a symbol with a color having a saturation less than a threshold.

FIG. 17 is a diagram illustrating the symbol 700 with a color having a saturation less than the threshold. In FIG. 17, a saturation of the peripheral region 710 is assumed to be greater than the threshold. In such a case, the image processing unit 111 determines that the color of the symbol 700 is to be a color with a saturation less than the threshold. Thus, since the symbol 700 is not hidden amongst the peripheral region 710, a repairman or an engineer can visually check a reading direction.

The image processing unit 111 may alternatively determine that the color of the symbol is to be a color having a saturation greater than the threshold if the saturation of the pixels of the peripheral region 700 is less than the threshold. For example, the relevant threshold can be set in advance stored in the NVRAM 104. RGB values for the color with a saturation greater than the threshold to be used for the symbol 700 may also be stored in the NVRAM 104 or may be appropriately calculated or set in accordance with the calculated average pixel values of the peripheral region 700.

Figure 18:
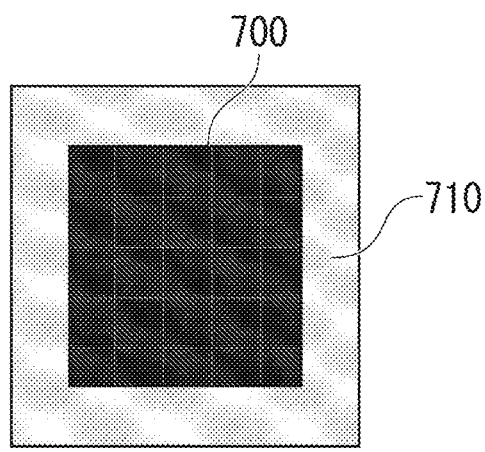
FIG. 18 is a diagram illustrating a symbol with a color having a saturation greater than a threshold.

FIG. 18 is a diagram illustrating the symbol 700 with a color having a saturation greater than a threshold. In FIG. 18, the saturation of the peripheral region 710 is less than the threshold. In such a case, the image processing unit 111 determines that the color of the symbol 700 is to be a color with a saturation greater than the threshold.

Figure 19:
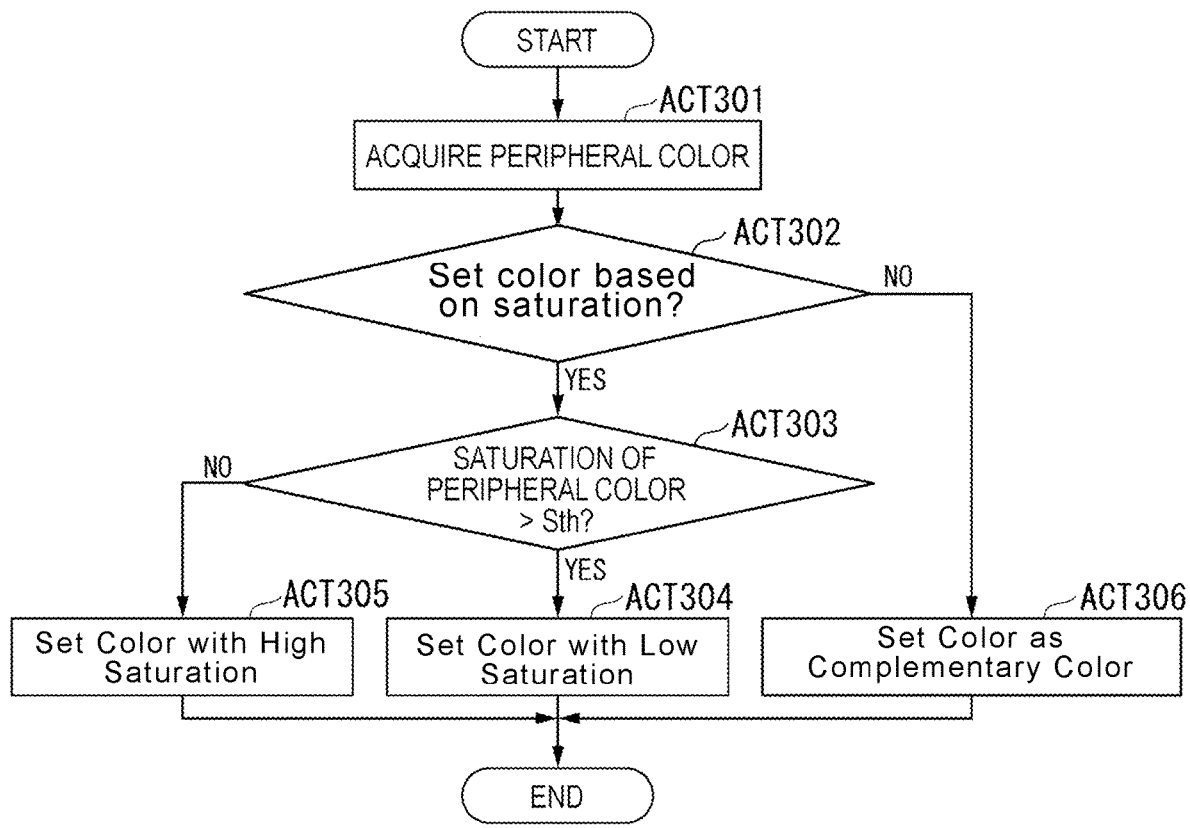
FIG. 19 is a flowchart of a color determination process.

FIG. 19 is a flowchart of the above-described color determination process. The image processing unit 111 acquires a peripheral color (ACT301). The peripheral color is color expressed with the pixel values of the pixels of the peripheral region. The image processing unit 111 determines whether the color of a symbol is to be determined based on a saturation of the peripheral color (ACT301). As methods of setting the color for a symbol 700 or the like, there is a method of setting the color based on saturation level of the peripheral region 710 and a method of setting the color for the symbol 700 to be a complementary color of the average color value of the peripheral region 710. The method of setting the color for the symbol 700 can be preset by a user and the relevant setting stored in the NVRAM 104. The image processing unit 111 performs the determination of ACT304 with reference to the setting stored in the NVRAM 104.

If the color is to set in accordance with saturation (YES in ACT302), the image processing unit 111 next determines whether the saturation of the peripheral color is greater than a threshold Sth (ACT303). If the saturation of the peripheral color is greater than the threshold Sth (YES in ACT303), the image processing unit 111 sets the color of the symbol 700 to have a saturation less than the threshold, (ACT304) and then ends the process.

If the saturation of the peripheral color is equal to or less than the threshold Sth (NO in ACT303), the image processing unit 111 sets the color of the symbol 700 to have a saturation greater than the threshold, (ACT305) and then ends the process.

If the color of the symbol 700 is to be selected as a complementary color rather by saturation (NO in ACT302), the image processing unit 111 sets the color of the symbol 700 to be a complementary color of the peripheral color (ACT306) and then ends the process.

In the above-described example, a plurality of reading-direction images in different forms may be provided. For example, the reading-direction images in the different forms may be combined so that image data obtained from a document sheet placed on a platen glass can be distinguished from image data obtained via the ADF 305. If the ADF 305 can perform a double-sided reading of a document sheet, reading-direction images in the different forms may be combined so that image data obtained from the front surface of the document sheet can be distinguished from image data obtained from the rear surface.

Next, a combined region determination process will be described. As described above, if a reading-direction image is combined with image data generated by scanning, the reading-direction image may be hidden depending on position of the combined region with respect to the scanned image.

Accordingly, the image processing unit 111 may potentially select a position/placement for the reading-direction image in accordance with pixel values in the scanned image data. In this process, the color to be used for the symbol 700 can be set in a color determination process based on surrounding pixels of the selected position/placement for the symbol 700 or otherwise may be a fixed value.

Figure 20:
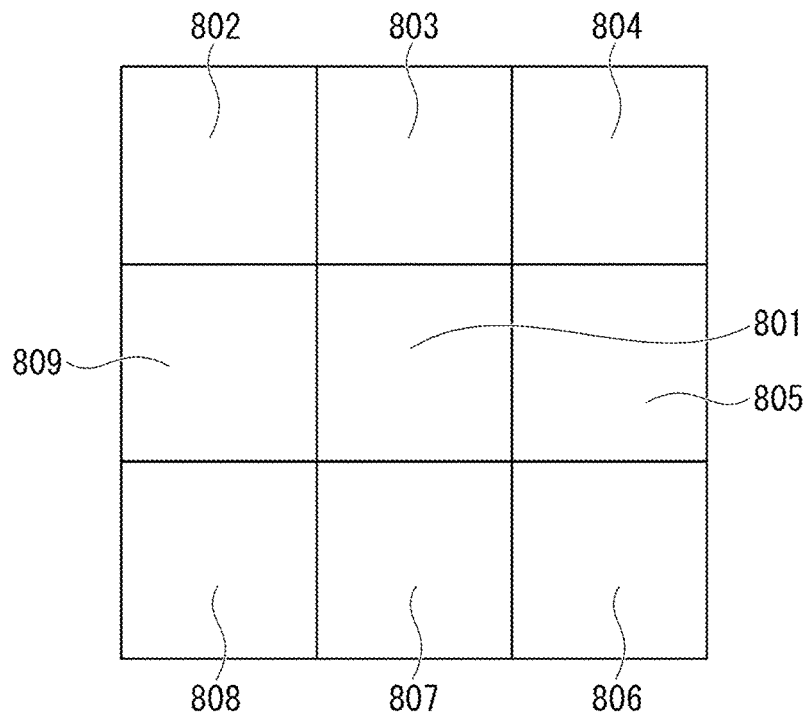
FIG. 20 is a diagram illustrating a plurality of divided regions.

The image processing unit 111 may select the position/placement for the combined region from among a plurality of candidate regions. FIG. 20 is a diagram illustrating a plurality of candidate regions obtained by dividing a region of the image data into a plurality of regions. FIG. 20 illustrates nine candidate regions 801, 802, 803, 804, 805, 806, 807, 808, and 809. The candidate regions illustrated in FIG. 20 are merely one example. The number of candidate regions is not necessarily limited to nine and the shape and arrangement of the regions are not limited to the example of FIG. 20 either. The candidate regions may even overlap each other in part.

The image processing unit 111 first acquires the color (e.g., the average color value (r, g, b)) of the candidate region 801. If the symbol 700 would be hidden if placed in candidate region 801, the image processing unit 111 searches for another candidate region in which the symbol 700 would not be hidden if placed therein. The search order of the candidate regions may be the numerical order of the candidate regions 802, 803, 804, 805, 806, 807, 808, and 809 or any other order. The candidate region in which the symbol would not be hidden if placed therein, are each referred to in this context as a combinable region.

One of the combinable regions (eligible candidate regions) may be a "white" region, where "white" need not mean completely white (true white; RGB (255, 255, 255)). That is, the color such a combinable region may be a color that is substantially white or near white.

Specifically, the color determination of the combinable regions can be performed using a threshold Rth compared to a pixel value of red, a threshold Gth compared to a pixel value of green, and a threshold Bth compared to a pixel value of blue. For example, these thresholds are set in advance and stored in the NVRAM 104. For example, each of Rth, Bth, and Gth is set to "230."

The image processing unit 111 determines whether the color (r, g, b) of a candidate region satisfies r>Rth, g>Gth, and b>Bth. This determination is referred to as a "white determination". The image processing unit 111 determines that the candidate region is to be used if the white determination is positive (values exceed the thresholds). If the white determination is negative (values do not exceed the thresholds), the image processing unit 111 performs the white determination on a subsequent candidate region.

If the white determination is negative for all the candidate regions, the image processing unit 111 selects the candidate region for which the value r+g+b is the largest. The image processing unit 111 may then perform the above-described color determination process on the candidate region 801 and add the symbol 700 of an appropriately selected color to the candidate region 801.

The image processing unit 111 may check whether the saturation of the color (r, g, b) of the candidate regions is less than a threshold. This is referred to as "saturation determination". The image processing unit 111 checks whether a candidate region has a positive saturation determination (pixel value exceeds the threshold). If the saturation determination is negative, the image processing unit 111 performs the saturation determination on the next candidate region.

If the saturation determination is negative for all the candidate regions, the image processing unit 111 may select the candidate region for which the saturation is the smallest. The image processing unit 111 may perform the color determination process on the selected candidate region and add the symbol 700 to the candidate region.

Figure 21:
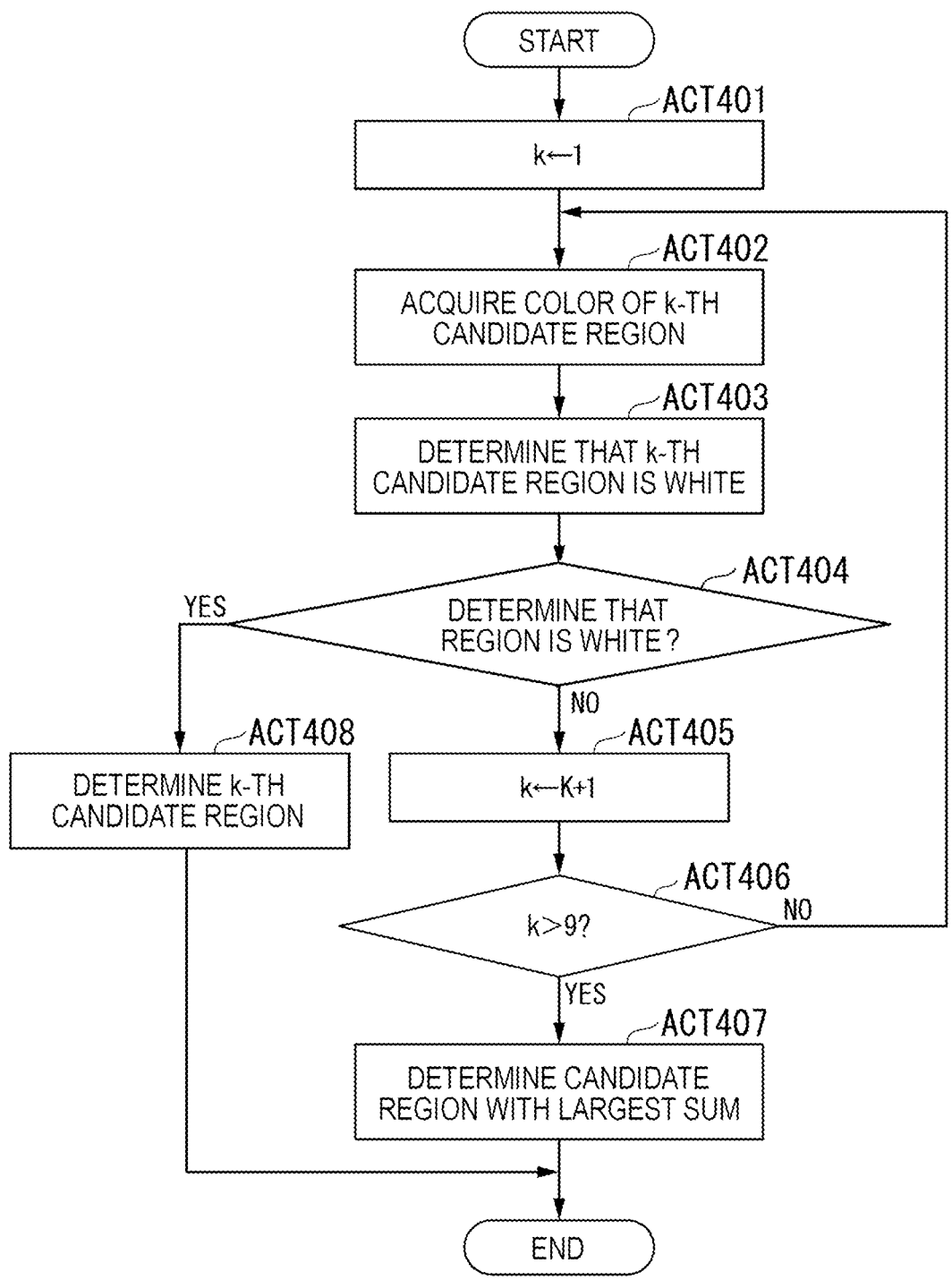
FIG. 21 is a flowchart of a combined region determination process through white determination.

FIG. 21 is a flowchart of the above-described combined region determination process through the white determination. In the flowchart, k-th (where k=1 to 9) candidate regions correspond to the regions 801, 802, 803, 804, 805, 806, 807, 808, and 809.

In FIG. 21, the image processing unit 111 initializes a loop counter k to "1" (ACT401). The image processing unit 111 acquires the color of the k-th candidate region (ACT402). The image processing unit 111 performs the white determination process on the acquired color of the k-th candidate region (ACT403). If the k-th candidate region is white (YES in ACT404), the image processing unit 111 selects the k-th candidate region (ACT408) and ends the process.

If the result of the white determination is negative (NO in ACT404), the image processing unit 111 increments loop counter k (ACT405). The image processing unit 111 checks whether k is greater than "9" (ACT406). If k is equal to or less than "9" (NO in ACT406), the image processing unit 111 causes the process to proceed to ACT402 to perform the white determination on the next candidate region. If k is greater than "9" (YES in ACT406), the white determination has been performed on all the available candidate regions. Accordingly, the image processing unit 111 selects the candidate region for which the sum (r+g+b) in is the largest (ACT407) and then ends the process.

Figure 22:
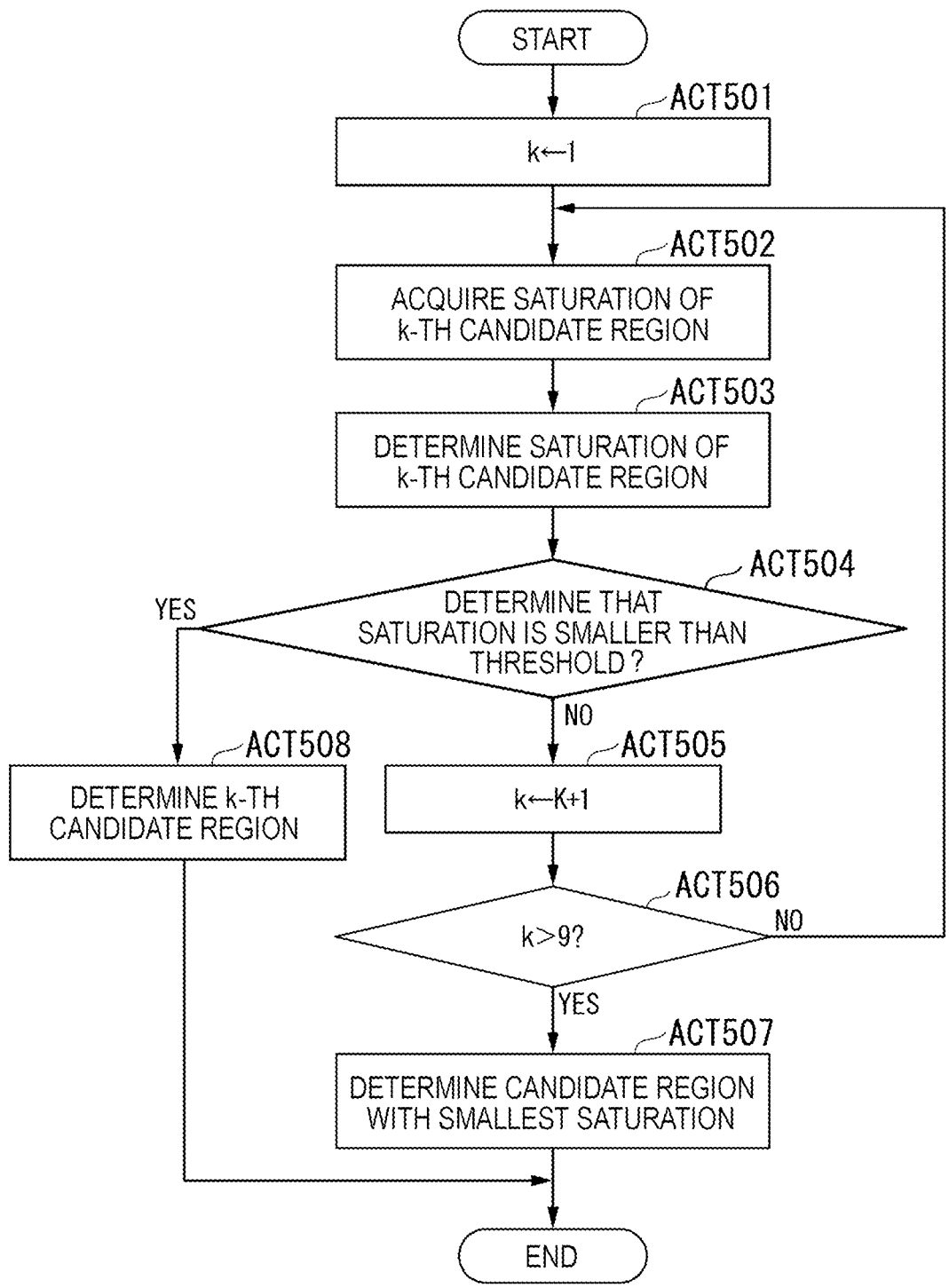
FIG. 22 is a flowchart of a combined region determination process through saturation determination.

FIG. 22 is a flowchart of the combined region determination process by saturation determination. In the flowchart, the k-th (where k=1 to 9) candidate regions correspond to the regions 801 to 809 as depicted in FIG. 20.

In FIG. 22, the image processing unit 111 initializes the loop counter k to "1" (ACT501). The image processing unit 111 acquires the saturation of the k-th candidate region (ACT502). The image processing unit 111 performs a saturation determination for the candidate region (ACT503). If the saturation of the k-th candidate region is less than the threshold (YES in ACT504), the image processing unit 111 selects this candidate region (ACT508) and then ends the process.

If the saturation determination is negative (NO in ACT504), the image processing unit 111 increments the loop counter k (ACT505). The image processing unit 111 checks whether k is greater than "9" (ACT506). If k is equal to or less than "9" (NO in ACT506), the image processing unit 111 causes the process to proceed to ACT502 to perform the saturation determination on the next candidate region. If k is greater than "9" (YES in ACT506), the saturation determination has been performed on all the available candidate regions. The image processing unit 111 the selects the candidate region for which the saturation is the smallest (ACT507) and then ends the process.

Figure 23:
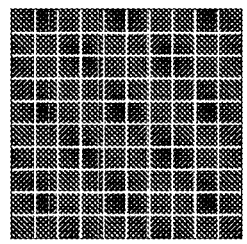
FIG. 23 is a diagram illustrating a pattern image indicating a reading-direction image.

In the present embodiment, the symbol may be a pattern type image indicating a reading-direction image. FIG. 23 is a diagram illustrating such a pattern type image to be used as a reading-direction image. In the example of FIG. 23, a pattern image with vertical lines is used as a reading-direction image. Then, for example, a repairman or an engineer can visually check a reading direction since it is easy to distinguish the symbol.

The color determination process and combined region determination (selection) process may be combined. Specifically, if there is any restriction on the color of the symbol and it checked in the color determination whether the symbol having one of the acceptable colors for the symbol would be hidden, the image processing unit 111 may perform the combined region determination process based on the possible colors of the symbols.

If the determination is positive in ACT406 or ACT506 of the combined region determination process, the image processing unit 111 may then perform the color determination process.

In this way, if the color determination process and the combined region determination process are combined, a probability of the symbol not being hidden is higher than if the color determination process and the combined region determination process are not combined.

The color determination process and the combined region determination process are performed according to the image data obtained through scanning, but similar processes may be applied to print data (e.g., a print file or a print job including image data such as that acquired from an external device or the like).

The main CPU 101 and the image processing unit 111 may be integrated into a single processor. The image processing device may not include the printer 400.

According to the above-described embodiment of the image processing device 1, it is possible to provide the image processing device capable of easily identifying a reading direction.

While certain embodiments have been described these embodiments have been presented by way of example only, and are not intended to limit the scope of the inventions. Indeed, the novel embodiments described herein may be embodied in a variety of other forms; furthermore, various omissions, substitutions and changes in the form of embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
a scanner configured to read an image formed on a sheet along a reading direction and generate image data; and
a processor configured to:
select a first region of the generated image data into which a first image indicating the reading direction is to be combined,
set a pixel value of the first image in accordance with a pixel value of a pixel around the first region, and
combine the first image having the set pixel value into the selected first region of the image data and output the combined image data.

2. The image processing apparatus according to claim 1, wherein the pixel value of the first image indicates a first color that is different from a second color indicated by the pixel value of the pixel around the first region.

3. The image processing apparatus according to claim 2, wherein the first color is a complementary color of the second color.

4. The image processing apparatus according to claim 1, wherein the processor is further configured to:
   determine whether a saturation of color of the first region is greater than a threshold,
   upon determining that the saturation is greater than the threshold, set the pixel value of the first image to have a saturation less than the threshold, and
   upon determining that the saturation is not greater than the threshold, set the pixel value of the first image to have a saturation greater than the threshold.

5. The image processing apparatus according to claim 1, wherein the first image includes a pattern of images arranged along the reading direction.

6. The image processing apparatus according to claim 1, wherein the processor is further configured to:
   acquire a first resolution that has been used by the scanner to read the image and a second resolution that is used to store the generated image data in a storage device, and
   before combining the first image, correct a location of the first region when the first and second resolutions are different.

7. The image processing apparatus according to claim 1, further comprising:
   a printer configured to print an image on a sheet along a printing direction, wherein
   the processor is further configured to:
      select a second region of the generated image data into which a second image indicating the printing direction is to be combined based on a location of the first region in the generated image data,
      combine the second image into the second region of the image data, and
      output the combined image data to the printer.

8. The image processing apparatus according to claim 7, wherein the first and second images have different shapes.

9. The image processing apparatus according to claim 7, wherein
   the processor is further configured to expand or reduce the image data according to a designated magnification ratio for printing, and
   the first and second regions are selected such that the first and second regions will be printed on a sheet.

10. The image processing apparatus according to claim 7, wherein the first and second images each include two symbols separated from each other in a direction perpendicular to the reading direction or the printing direction, respectively.

11. An image processing apparatus, comprising:
    a scanner configured to read an image formed on a sheet along a reading direction and generate image data thereof; and
    a processor configured to:
       determine a plurality of candidates of a first region of the generated image data into which a first image indicating the reading direction is to be combined;
       determine a pixel value for each of the candidates and select one of the candidates as the first region based on the determined pixel value; and
       combine the first image into the first region of the image data and output the combined image data.

12. The image processing apparatus according to claim 11, wherein the processor selects, as the first region, one of the candidates having a pixel value corresponding to or closest to white.

13. The image processing apparatus according to claim 11, wherein the processor selects, as the first region, one of the candidates having a saturation of color less than a threshold.

14. The image processing apparatus according to claim 11, wherein the processor is further configured to divide the generated image data into a plurality of regions to form the candidates of the first region.

15. The image processing apparatus according to claim 11, wherein the first image includes a pattern of images arranged along the reading direction.

16. The image processing apparatus according to claim 11, wherein the processor determines the pixel value for each of the candidates by calculating an average of pixel values of pixels included in said each of the candidates.

17. An image processing method, comprising:
    reading an image formed on a sheet along a reading direction and generating image data thereof;
    selecting a first region of the generated image data into which a first image indicating the reading direction is to be combined;
    setting a pixel value of the first image in accordance with a pixel value of a pixel around the first region; and
    combining the first image having the set pixel value into the first region of the image data and outputting the combined image data.

18. The image processing method according to claim 17, wherein the set pixel value of the first image indicates a first color that is different from a second color indicated by the pixel value of the pixel around the first region.

19. The image processing method according to claim 18, wherein the first color is a complementary color of the second color.

20. The image processing method according to claim 17, further comprising:
    determining whether a saturation of color of the first region is greater than a threshold;
    upon determining that the saturation is greater than the threshold, setting the pixel value of the first image to have a saturation less than the threshold; and
    upon determining that the saturation is not greater than the threshold, setting the pixel value of the first image to have a saturation greater than the threshold.

* * * * *